United States Patent
Li et al.

(10) Patent No.: US 9,014,179 B2
(45) Date of Patent: Apr. 21, 2015

(54) COMMUNICATION METHOD USING SPATIAL DIVISION MULTIPLE ACCESS (SDMA), AND BASE STATION

(75) Inventors: Xiaojiao Li, Beijing (CN); Jianfei Zhang, Beijing (CN); Shiqiang Suo, Beijing (CN); Bo Han, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 194 days.

(21) Appl. No.: 13/701,405

(22) PCT Filed: Sep. 6, 2011

(86) PCT No.: PCT/CN2011/079376
§ 371 (c)(1),
(2), (4) Date: Nov. 30, 2012

(87) PCT Pub. No.: WO2012/031550
PCT Pub. Date: Mar. 15, 2012

(65) Prior Publication Data
US 2013/0070722 A1    Mar. 21, 2013

(30) Foreign Application Priority Data

Sep. 6, 2010    (CN) .......................... 2010 1 0273868

(51) Int. Cl.
*H04L 12/50* (2006.01)
*H04W 72/12* (2009.01)
*H04W 72/04* (2009.01)

(52) U.S. Cl.
CPC ........ *H04W 72/1273* (2013.01); *H04W 72/046* (2013.01)

(58) Field of Classification Search
CPC .. H04L 5/0007; H04L 1/0618; H04B 7/0697; H04B 7/0413; H04B 7/0669; H04B 7/024; H01Q 1/246
See application file for complete search history.

(56) References Cited

U.S. PATENT DOCUMENTS 6,108,323 A    8/2000  Gray
7,352,718 B1 *  4/2008  Perahia et al. ................ 370/329

(Continued)

FOREIGN PATENT DOCUMENTS

WO    WO-2010/070194    6/2010

OTHER PUBLICATIONS

Alcatel-Lucent et al., "Best Companion Reporting for Single-Cell MU-MIMO Pairing," 3GPP Draft, R1-094613, Nov. 9-13, 2009, 6 pgs.

(Continued)

*Primary Examiner* — Fan Ng
(74) *Attorney, Agent, or Firm* — Gilberto M. Villacorta; Kyle R. Canavera; Foley & Lardner LLP

(57) ABSTRACT

The present invention relates to the field of communications, and provides a communication method using spatial division multiple access (SDMA), to optimize an existing spatial division multiplexing mechanism. The method comprises: for each channel including a service channel and a control channel, according to a service information amount and/or a control information amount of the channel and a decision threshold corresponding to the channel, determining whether to activate SDMA for the channel; according to a decision result for a remote radio unit (RRU) to which each user belongs, allocating resources in an SDMA manner for the channel with the SDMA activated, and sending data of each user on the channel only on the RRU to which the user belongs; for a channel with the SDMA not activated, sending all data on the channel on all RRUs. The present invention is applicable to the spatial division multiplexing of various physical channels and physical signals specified by the standards of LTE and LTE-A systems, and can further improve utilization of resources in the system, the throughput of the system, and the data transmission rate.

19 Claims, 5 Drawing Sheets

(56) References Cited

U.S. PATENT DOCUMENTS 7,460,494 B2* 12/2008 Sandhu .................. 370/264
2010/0091743 A1 4/2010 Kazmi et al.
2011/0255434 A1* 10/2011 Ylitalo .................. 370/252

OTHER PUBLICATIONS

Examination Report received in European Application No. 11823073.9 mailed Apr. 30, 2014.
Hitachi et al., "A feedback scheme for downlink transmission with multi-point multi-user MIMO," 3GPP Draft, R1-091178, Mar. 23-27, 2009, 6 pgs.
Search Report received in European Application No. 11823073.9 mailed Jul. 24, 2013.
Supplementary European Search Report issued in counterpart European Application No. 11823073.9, mailed Jul. 24, 2013, 5 pgs.
International Search Report for PCT/CN2011/079376—mailed Dec. 15, 2011.
Shin Hanbing LI Xin Ding Haiyu Huang Yuhong, Application of Space Division Multiplexing in TD-SCDMA and LTE, Telecom Engineering Technics and Standardization, Jan. 31, 2010, No. 1, pp. 1-4.

* cited by examiner

COMMUNICATION METHOD USING SPATIAL DIVISION MULTIPLE ACCESS (SDMA), AND BASE STATION

This application is a US National Stage of international Application No. PCT/CN2011/079376, filed Sep. 6, 2011, designating the United States, and claiming the benefit of Chinese Patent Application No. 201010273868.0, filed with the Chinese Patent Office on Sep. 6, 2010 and entitled "Method and eNB for communication using space division multiple access SDMA", both of which are hereby incorporated by reference in their entireties.

FIELD

The present invention relates to the field of communications and particularly to a method and eNB for communication using a Space Division Multiple Access (SDMA).

BACKGROUND

A Space Division Multiple Access (SDMA) generally refers to a technology of resource multiplexing through spatial isolation between users, that is, an eNB allocates the same resource to users in different separate spaces to thereby improve a utilization ratio of the resource and enhance greatly the throughput of the system and a data transmission rate of the users.

The SDMA technology can be applied widely to indoor and outdoor scenarios to thereby improve the capacity of a cell, data transmission rate and the spectrum utilization ratio of a system and also enhance the performance of coverage in special scenarios, for example, space division multiplexing indoors across floors can multiplex the same resource for users across the floors to thereby improve greatly the capacity of the system while reducing the number of cell handovers for a user climbing up and down the floors. In another example, space division multiplexing applied outdoors to the coverage of an express railway can reduce the number of frequent cell handovers in a short period of time due to mobility at a high speed to thereby improve effectively the coverage performance of the system.

An Evolved Node B (eNB) is a distributed base station equipment which is constituted of a Building Base band Unit (BBU) and Radio Remote Units (RRUs), i.e., an eNB is a base station combination which can be deployed flexibly in a distributed way.

The BBU is a part of the eNB responsible for processing data and deciding transmission data on each RRU. The RRU is a radio frequency transmission part of the eNB, each separate space has one corresponding RRU, one RRU can support data transmission on one or more channels, and each channel can be connected with one or more antennas, but data on a plurality of antennas on the same channel is combined for transmission. The number of channels in each separate space depends upon practical networking. Only single-port transmission can be performed when a single channel is configured in each separate space and multi-port transmission modes via two ports, four ports, etc., can be adopted when a plurality of ports are configured in each separate space. The BBU and the RRUs are connected together through optical fibers, and one BBU can process data on a plurality of RRUs concurrently. The processing power of the BBU depends upon the processing power and number of boards in the BBU and determines the number of RRUs that can be connected with the BBU.

An implementation of the SDMA technology requires a specific isolation requirement to be satisfied between the different RRUs, and isolation is achieved for the indoor SDMA generally through a penetrating loss across floors while isolation can be achieved outdoors through antenna orientation and a physical distance (e.g., street coverage, a cross-road or a fork-road, an express railway, etc.)

Essentially the SDMA technology is to perform space division multiplexing through spatial isolation between the different RRUs and to allocate the same resources to users served by the different RRUs. Ideally the throughput of the system increases constantly with an increasing multiplexing number and has an upper limit dependent upon the practical processing power of the BBU.

Taking as an example a BBU connected with a number L of RRUs where the different RRUs are intended for different floors, a signal processing model of the BBU and the RRUs is as illustrated in FIG. 1, where each RRU may receive a signal transmitted from a user, and a measuring module decides (an) RRU(s) serving the user by comparing received signal strengths of the signal transmitted from the user on the respective RRUs and submits serving information to a scheduling module; the scheduling module allocates resources to users at the respective floors by pairing the SDMA-enabled users served by the different RRUs and allocating the same resources to the paired users and also transmits pairing information and scheduling information to the measuring module and a data receiving module for next reception of a signal; and the measuring module transports corresponding measurement data to the data receiving module according to the previous pairing information for detection of user data. Also the scheduling module transports the current pairing information and scheduling information to the data receiving module for determination of transmission data on each RRU.

The Multiple User-Multiple Input Multiple Output (MU-MIMO) scheme is adopted for space division multiplexing of an existing LTE or LTE-A system, and since interference cancellation is required at a transmitter, a pre-coding algorithm of the scheme is highly complex; and since different beams formed on a plurality of antennas in the MU-MIMO are to be aimed at several paired users respectively, this scheme is inappropriate in a distributed antenna scenario with large spatial isolation between the antennas.

There are a variety of physical channels and physical signals dependent upon the types of data transmitted at a physical layer in the LTE and LTE-A systems. Different resource allocation schemes are adopted for the different physical channels and physical signals, and resource locations of a part of the channels are associated with each other, thus resulting in the feasibility and an implementation solution thereof with the SDMA. With the technology of space division multiplexing, space division multiplexing schemes of the respective channels have to be determined for the system. The existing algorithm supports a limited number of paired users with the MU-MIMO and can only be applicable to a data channel.

SUMMARY

Embodiments of the invention provide a method and eNB for communication using Space Division Multiple Access (SDMA) so as to perform space division multiplexing of a control channel and a traffic channel and to improve the number of users accommodated in and the spectrum utilization ratio of the system.

The invention provides a method for communication using Space Division Multiple Access, SDMA, which includes:

determining whether to SDMA-enable different channels according to the amount of traffic information and the amount of control information of the different channels and decision thresholds corresponding to the different channels, where the different channels include a traffic channel and a control channel;

allocating a resource in an SDMA scheme for a SDMA-enabled channel and transmitting data of each of different users on the channel only on an RRU or RRUs serving the user, according to decision results of Remote Radio Units, RRUs, serving the different users; and for a SDMA-disabled channel, transmitting all data on the channel on all the RRUs.

The invention further provides an eNB including:

an SDMA-enabling determining unit configured to determine whether to SDMA-enable different channels according to the amount of traffic information and the amount of control information of the different channels and decision thresholds corresponding to the different channels, where the different channels include a traffic channel and a control channel;

a first transmitting unit configured to allocate a resource in an SDMA scheme for a SDMA-enabled channel and transmit data of each of different users on the channel only on an RRU or RRUs serving the user, according to decision results of Remote Radio Units, RRUs, serving the different users; and a second transmitting unit configured, for a SDMA-disabled channel, to transmit all data on the channel on all the RRUs.

With the foregoing method and eNB for communication using the Space Division Multiple Access (SDMA) proposed in the invention, there are the following advantageous effects: a method for space division multiplexing of respective physical channels and physical signals in compliance with the specifications of the LTE and LTE-A system standards is devised and can further improve the utilization ratio of resources in the system, the throughput of the system and data transmission rate.

DETAILED DESCRIPTION OF THE EMBODIMENTS

A method and eNB for communication using a Space Division Multiple Access (SDMA) proposed in the invention will be described below in further details with reference to the drawings and embodiments thereof.

There are a variety of physical channels and physical signals dependent upon the types of data transmitted at a physical layer in the LTE and LTE-A systems. Different resource allocation schemes are adopted for the different physical channels and physical signals, and resource locations of a part of the channels are associated with each other, thus resulting in the feasibility and an implementation solution thereof with an SDMA.

The different resource allocation schemes adopted for the different physical channels and physical signals are described briefly as follows:

1) PBCH (Physical Broadcast Channel);
2) PMCH (Physical Multicast Channel);
3) PCFICH (Physical Control Format Indicator Channel);
4) CRS (Cell Reference Signal);
5) SS (Synchronous Signal);
6) PDSCH (Physical Downlink Shared Channel);
7) PDCCH (Physical Downlink Control Channel);
8) PHICH (HARQ Indicate Channel);
9) DRS (Dedicated Reference Signal);
10) PUSCH (Physical Uplink Shared Channel);
11) PUCCH (Physical Uplink Control Channel);
12) PRACH (Packet Random Access Channel);
13) DMRS (Demodulate Reference Signal); and
14) SRS (Sounding Reference Signal).

Particularly 1) to 5) belong to physical channels or physical signals at a cell level, and their resource locations are related to only a cell ID but are not related to any user parameter.

Particularly 6) to 14) belong to physical channels or physical signals at a user level, where resource locations of the PDSCH, the PUSCH, and the PUCCH which is not dynamically scheduled are indicated in downlink control signalling, and their corresponding uplink DMRSs also exist on corresponding Physical Resource Blocks (PRBs). The resource location of the PDCCH is determined by a Radio Network Temporary Identifier (RNTI) of a user, and this location also determines the resource location of the dynamically scheduled PUCCH corresponding thereto. The resource location of the PHICH is determined by the corresponding PUSCH and the DMRS of the PUSCH. The resource location of the PRACH is determined by a cell, and an accessing user selects a location of the PRACH randomly for an access.

Figure 1:
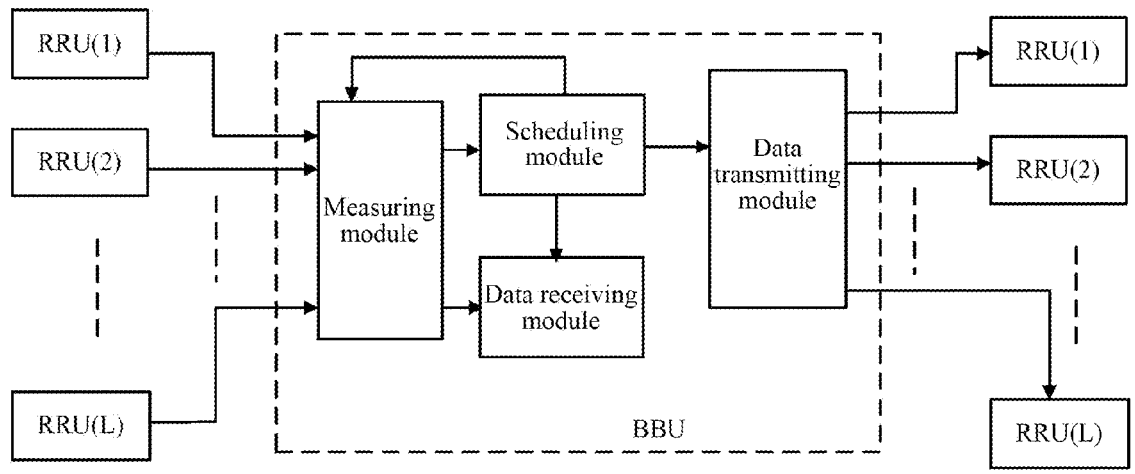
FIG. 1 is a structural diagram of a signal processing model of a BBU and RRUs in the prior art.
Figure 2:
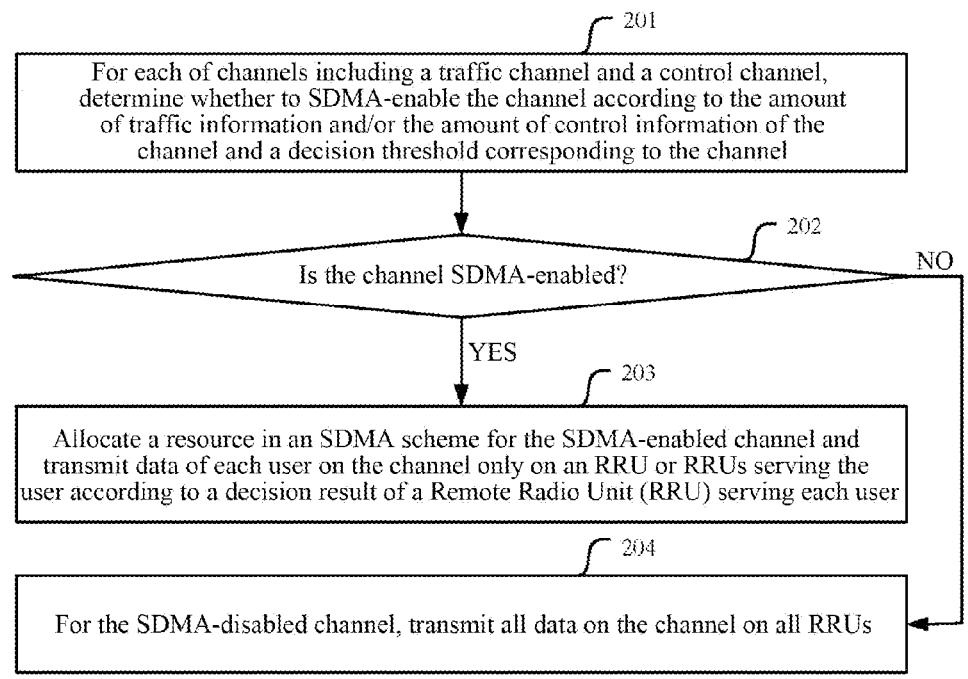
FIG. 2 is a flow chart of a method for communication using a Space Division Multiple Access (SDMA) according to the invention.

The existing algorithm supports a limited number of paired users with MU-MIMO and can be applicable to a traffic channel. The amount of control information required for users also increases with an increasing number of users, and when the number of control resources in the system becomes saturated, the control channels have to be divided spatially to thereby increase the number of users that can be accommodated in the system and improve the overall capacity of the system. Thus the invention provides a method for communication using a Space Division Multiple Access (SDMA), and as illustrated in FIG. 2, the method includes:

Operation 201, for each of channels including a traffic channel and a control channel, whether to SDMA-enable the channel is determined according to the amount of traffic information and/or the amount of control information of the channel and a decision threshold corresponding to the channel;

Different types of channels are used for transmitting different types of data, and at present, a channel is generally categorized into a traffic channel or a control channel dependent upon whether transmission data is traffic information or control information; and the number of required resources is currently reflected by the amount of traffic information and the amount of control information of a cell user on different channels, and the invention decides whether to adopt space division multiplexing by making a SDMA decision for both the traffic channel and the control channel. Whether to SDMA-enable each of different channels is determined according to the corresponding amounts of service information or amounts of control information on the channel and the decision threshold corresponding to the channel as well as a correspondence relationship of resource locations between the different channels.

The decision thresholds corresponding to the different channels can be set dependent upon a current bandwidth and an uplink and downlink timeslot configuration of the system and other system information. The decision thresholds corresponding to the respective channels may be the same or may be different.

Operation 202, whether a channel is SDMA-enabled is determined, and when SDMA-enabled is determined, an operation S203 is executed; when SDMA-disabled is determined, an operation S204 is executed;

Operation 203, an SDMA scheme is adopted for allocating a resource for a SDMA-enabled channel, in which data of each user on the channel is transmitted only on an RRU or RRUs serving the user according to decision results of Remote Radio Units (RRUs) serving respective users;

One RRU corresponds to one space, and RRUs serving different users can be determined in the existing mechanism. Preferably an RRU or RRUs serving a user can be decided as follows: an RRU or RRUs serving an initially accessing user is decided from a Packet Random Access Channel (PRACH), and an RRU or RRUs serving an already accessing user is decided from a Sounding Reference Signal (SRS); and the RRUs serving the respective users are recorded and periodically updated.

Triggering of SDMA-enabling of a specific channel is determined, and then resources are allocated in an SDMA scheme for data transmission of different users on the channel, and data of these users on the channel will be transmitted on their own respective serving RRUs for the purpose of signal isolation on the same multiplexed resource.

Operation 204, for a SDMA-disabled channel, all data on the channel is transmitted on all RRUs.

Spatial isolation of signals will not be considered because no space division multiplex is adopted and signals shall be transmitted on all the RRUs in order to improve a success ratio of reception.

As can be apparent, the foregoing method according to the invention can be applicable to space division multiplexing of the respective physical channels and physical signals specified in the LTE and LTE-A system standards and will not be limited to space division multiplexing of a traffic channel, thereby further improving a utilization ratio of resources in the system and the throughput and data transmission ratio of the system. Preferred embodiments of determining whether to SDMA-enable the respective channels according to corresponding amounts of traffic information and amounts of control information on the different channels and decision thresholds corresponding to the channels as well as a correspondence relationship of resource locations between the respective channels will be described particularly in connection with the respective traffic channels and control channels.

1) For a Physical Downlink Shared Channel (PDSCH):

The amount of downlink traffic information is transmitted on a Physical Downlink Shared Channel (PDSCH), and in this embodiment whether to SDMA-enable the PDSCH is determined by comparing the total amount of downlink traffic information in a current cell with a first downlink enabling threshold and a first downlink disabling threshold, preferably in the following scheme:

The PDSCH is SDMA-enabled upon determining that the current PDSCH is SDMA-disabled and that the total amount of downlink traffic information in the current cell is above the first downlink enabling threshold for a first preset length of time; and The PDSCH is SDMA-disabled upon determining that the current PDSCH is SDMA-enabled and that the total amount of downlink traffic information in the current cell is below or at the first downlink disabling threshold for a second preset length of time.

When the PDSCH is SDMA-enabled, a resource is allocated in an SDMA scheme for the PDSCH, that is, users served by different spaces are paired on the PDSCH, and the same physical resource is allocated to data transmission of the paired users on the PDSCH. The existing resource allocation scheme for the PDSCH can well support space division multiplexing, and SDMA-enabling of the PDSCH will not be further described here in details.

The foregoing first enabling threshold is above the first disabling threshold, and the first preset length of time and the second preset length of time can be set flexibly as needed and may be the same or may be different.

2) For a Physical Downlink Control Channel (PDCCH) and a Corresponding Dynamically Scheduled Physical Uplink Control Channel (PUCCH):

Whether to SDMA-enable a Physical Downlink Control Channel (PDCCH) and a corresponding dynamically scheduled Physical Uplink Control Channel (PUCCH) is determined by comparing the amount of downlink control information required for currently scheduled users with a second downlink enabling threshold and a second downlink disabling threshold, preferably in the following scheme:

The PDCCH and the corresponding dynamically scheduled PUCCH thereof are SDMA-enabled upon determining that the current PDCCH is SDMA-disabled and that the total amount of downlink control information required for the currently scheduled users is above the second downlink enabling threshold for a third preset length of time; and The PDCCH and the corresponding dynamically scheduled PUCCH thereof are SDMA-disabled upon determining that the current PDCCH is SDMA-enabled and that the total amount of downlink control information required for the currently scheduled users is below or at the second downlink disabling threshold for a fourth preset length of time.

The resource location of the PDCCH is determined by an RNTI of a user, and this location also determines the resource location of the corresponding dynamically scheduled PUCCH thereof. Thus the same SDMA decision scheme is adopted for the PDCCH and the dynamically scheduled PUCCH bound therewith.

In this embodiment, the foregoing second enabling threshold is above the second disabling threshold, and specific values of the thresholds are set dependent upon a bandwidth and a timeslot configuration of the system and other system information; and the third preset length of time and the fourth preset length of time can be set flexibly as needed and may be the same or may be different.

When the PDCCH is SDMA-enabled, a resource is allocated in an SDMA scheme for the PDCCH, that is, users served by different spaces are paired on the PDCCH, and the same physical resource is allocated to data transmission of the paired users on the PDCCH. When the dynamically scheduled PUCCH corresponding to the PDCCH is SDMA-enabled, a resource is allocated in an SDMA scheme for the PUCCH, that is, users served by different spaces are paired on the PUCCH, and the same physical resource is allocated to data transmission of the paired users on the corresponding dynamically scheduled PUCCH.

As can be apparent from the specifications of the existing LTE and LTE-A standards, unlike other physical channels, the resource location of the PDCCH is not signaled to a UE, but instead a PDCCH search space of each UE is determined by an RNTI of the UE, and the UE detects blindly the PDCCH in various formats of Downlink Control Information (DCI) in the fixed search space. The existing resource allocation scheme for the PDCCH does not take the particularity of the PDCCH into account and can not well support space division multiplexing. A resource allocation scheme adopted for a PDCCH upon determining the PDCCH to be SDMA-enabled in a preferred embodiment of the invention will be given below.

Figure 3:
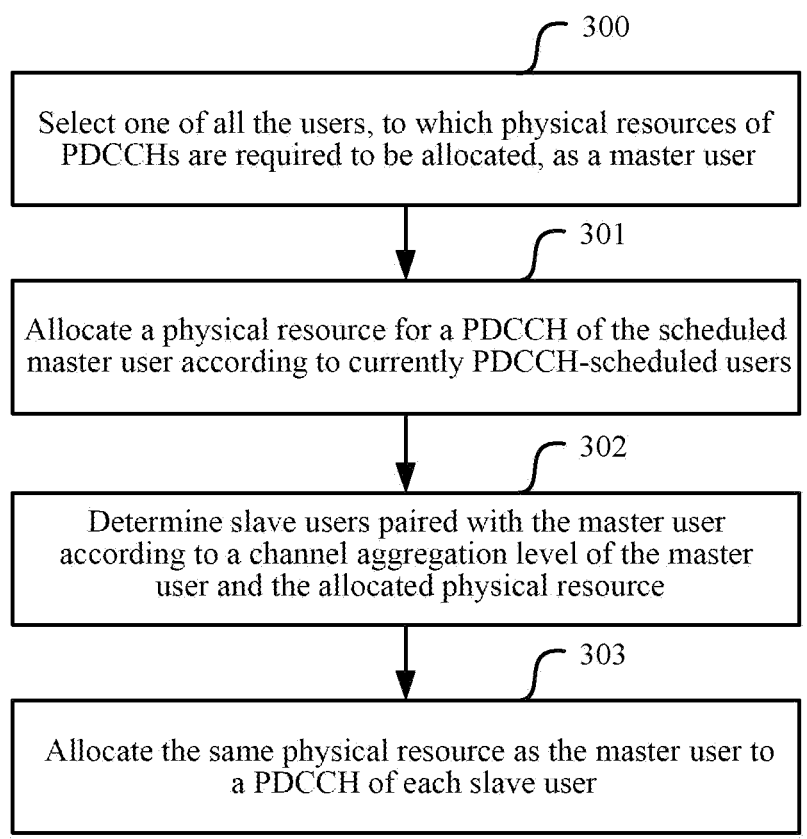
FIG. 3 is a flow chart of a resource allocation method adopted for an SDMA-enabled PDCCH according to an embodiment of the invention.

As illustrated in FIG. 3, when the PDCCH is SDMA-enabled, a resource is allocated in an SDMA scheme for the SDMA-enabled channel in an embodiment of the invention particularly as follows:

Operation 301, a physical resource for a PDCCH of a scheduled master user is allocated according to currently PDCCH-scheduled users;

Operation 302, slave users paired with the master user are determined according to a channel aggregation level of the master user and the allocated physical resource; and Operation 303, the same physical resource as the master user is allocated to a PDCCH of each slave user.

Particularly the master user is also a user in a cell, that is, a master user shall be selected from users in the cell. Specifically there may be included before the operation 301:

operation 300, one of all the users, to which physical resources of PDCCHs are required to be allocated, is selected as the master user.

Furthermore if the master user and the slave users paired with the master user are determined, then the determined users shall be deleted from all the users to which physical resources of PDCCHs are required to be allocated. Specifically there may be included after the operation 302:

the master user and the slave users are deleted from the users to which physical resources of PDCCHs are required to be allocated, and it is determined whether there is a further user to which a physical resource of a PDCCH is required to be allocated; and one of all users to which physical resources of PDCCHs are required to be allocated is selected as the master user upon determining that there is a further user to which a physical resource of a PDCCH is required to be allocated, and the process returns to the operation 301; or it is determined that all the users have physical resource allocated thereto upon determining that there is no further user to which a physical resource of a PDCCH is required to be allocated.

In the operation 300, all the users to which physical resources of PDCCHs are required to be allocated can be sorted, for example, by scheduling priorities, and one of all the users to which physical resources of PDCCHs are required to be allocated can be selected as the master user according to the scheduling priorities. Preferably the user with the highest scheduling priority can be selected from all the users, to which physical resources of PDCCHs are required to be allocated, as the master user; and of course, one of the users with a scheduling priority above a threshold can alternatively be selected as the master user, and the value of the threshold and a scheduling priority for a user can be set as needed.

It shall be noted that the embodiment of the invention will not be limited to the scheme in which the master user is determined according to a scheduling priority but can be applicable with other schemes in which the master user can be determined, for example, selected randomly, selected according to a signal quality, etc.

In the operation 301, a physical resource can be allocated for a PDCCH of the master user by obtaining physical resources unoccupied in a search space with an RNTI of and at a channel aggregation level of the master user and then select one of the obtained physical resources and allocating the selected physical resource to the PDCCH of the master user.

Particularly physical resource can be selected in any one of, but not limited to, the following schemes:

one of the obtained physical resources is selected in an order of logic indexes of the physical resources;

one of the obtained physical resources is selected randomly; and the number of slave users, paired with the master user, who can be supported on each unoccupied physical resource is determined, and a physical resource with the corresponding number above a threshold is selected.

Specifically in the operation 301, firstly an RNTI and a channel aggregation level of the master user are determined, and then Control Channel Elements (CCEs), i.e., physical resources, occupied for PDCCH candidate channels in a search space at the channel aggregation level of the master user are determined according to the RNTI and the channel aggregation level.

A set of PDCCH candidates to be detected is defined according to the search space, where the definition of a search space $S_k^{(L)}$ at an aggregation level L is given by a set of PDCCH candidates, and CCEs of a PDCCH candidate channel m in the search space $S_k^{(L)}$ are given in the equation of:

$$CCEs = L\left\{(Y_k + m) \bmod \left\lfloor \frac{N_{CCE,K}}{L} \right\rfloor\right\} + i. \qquad \text{Equation 1}$$

Where $i=0, \ldots, L-1$; $m=0, \ldots, M^{(L)}-1$; $M^{(L)}$ is the number of signals to be detected in a given search space; L is a channel aggregation level; $N_{CCE,K}$ is the total number of CCEs in a control region of a sub-frame k; $Y_K=(A \cdot Y_{k-1}) \bmod D$; $Y_{-1}=n_{RNTI} \neq 0$, $n_{RNTI}$ is an RNTI of a user, $A=39827$, $D=65537$, $k=\lfloor n_s/2 \rfloor$, and $n_s$ is a timeslot number in a radio frame.

If one of the determined physical resources is selected in an order of logic indexes of the physical resources, then m can take a value in an ascending order of values according to Equation 1, thus resulting in an order of XXX. Preferably the first physical resource can be selected. Of course, one of the first n physical resources can alternatively be selected, and the value of n can be set as needed.

If the number of slave users, paired with the master user, who can be supported on each CCE (i.e., unoccupied physical resource) is determined and the CCE with the largest number of slave users who can be supported is selected, then m can take a value in an ascending order of values according to Equation 1, CCEs occupied for PDCCH candidate channels in the search space at the channel aggregation level can be located sequentially, and then the different CCEs can be searched respectively for slave users, and the CCE with the largest number of slave users can be located and selected as a CCE corresponding to the master user. Of course, one of the located CCEs with a number of slave users above a threshold can alternatively be selected as a CCE corresponding to the master user. The specific value of the threshold can be set as needed.

In the operation 302, a determined slave user shall satisfy the following four conditions:

Condition 1. A slave user paired with the master user has the same channel aggregation level as that of the master user.

Condition 2. A search space of a slave user paired with the master user includes the physical resource allocated to the master user.

Condition 3. A slave user paired with the master user is served by (a) different RRU(s) from that or those serving the master user.

Condition 4. Each RRU includes only one slave user paired with the master user.

The search space including the physical resource allocated to the master user in the condition 2 relates to two scenarios: In one scenario, the search space of the slave user coincides exactly with the physical resource allocated to the master user, and in the other scenario, the search space of the slave user overlaps with the physical resource allocated to the master user, and the physical resource allocated to the master user lies exactly in the overlapping area.

Each RRU including only one slave user paired with the master user in the condition 4 means that each RRU may or may not include a slave user paired with the master user, but if the RRU includes a slave user paired with the master user, then only one slave user can be paired with the master user.

The two scenarios under the condition 2 can be represented in Equation 2, for example, for an LTE system, if the $m_{S1}$-th channel in a search space is occupied for the master user S1, then a user S2 is a user which can be paired so long as a search space of the user S2 satisfies Equation 2:

$$L\left\{(Y_{k,S1} + m_{S1}) \bmod \left\lfloor \frac{N_{CCE,K}}{L} \right\rfloor\right\} + i = $$
$$L\left\{(Y_{k,S2} + m_{S2}) \bmod \left\lfloor \frac{N_{CCE,K}}{L} \right\rfloor\right\} + i.$$

Equation 2

Where $m_{S1}$ and $m_{S2}$ may be equal (i.e. the first scenario) or may be unequal (i.e., the second scenario). A resource location allocated to the user S2 is the candidate channel $m_{S1}$ or $m_{S2}$ in the search space upon successful pairing.

In a specific implementation, a slave user can be determined in the operation 302 in numerous schemes, several of which will be listed below:

In a first scheme, all the users to which physical resources of PDCCHs are required to be allocated other than the master user are searched for the users with the same channel aggregation level of the master user and with a search space including the physical resource allocated to the master user;

The located users are grouped with all the users in each group being served by the same RRU(s); and All the groups with (a) different RRU(s) from that or those serving the master user are determined, and one user is selected from each determined group as a slave user paired with the master user.

In a second scheme, all the users to which physical resources of PDCCHs are required to be allocated other than the master user are grouped with all the users in each group being served by the same RRU(s); and All the groups with (a) different RRU(s) from the RRU(s) serving the master user are determined, and one user is selected from each determined group as a slave user paired with the master user, where the selected user has the same channel aggregation level as that of the master user and a search space of the selected user includes the physical resource allocated to the master user.

In the first and second schemes, one user is selected from the group as a slave user paired with the master user, where if there are a plurality of users in the other groups, then one user can be selected randomly or the user can be selected in each determined group according to a scheduling priority or to an interference value between paired users. For example, one user can be selected from those among the users in the group with a scheduling priority above a threshold; and preferably the user with the highest scheduling priority can be selected from the group. Alternatively one user can be selected from those among the users in the group with an interference value between paired users of the master user below a threshold; and preferably the user with the smallest interference value between paired users can be selected from the group. The foregoing two thresholds can be set as needed.

In a specific implementation, an execution body of the method according to the embodiment of the invention can be a base station (e.g., a macro Node B, an evolved Node B, a home Node B, etc.) or an RN device or another network-side equipment.

Figure 4:
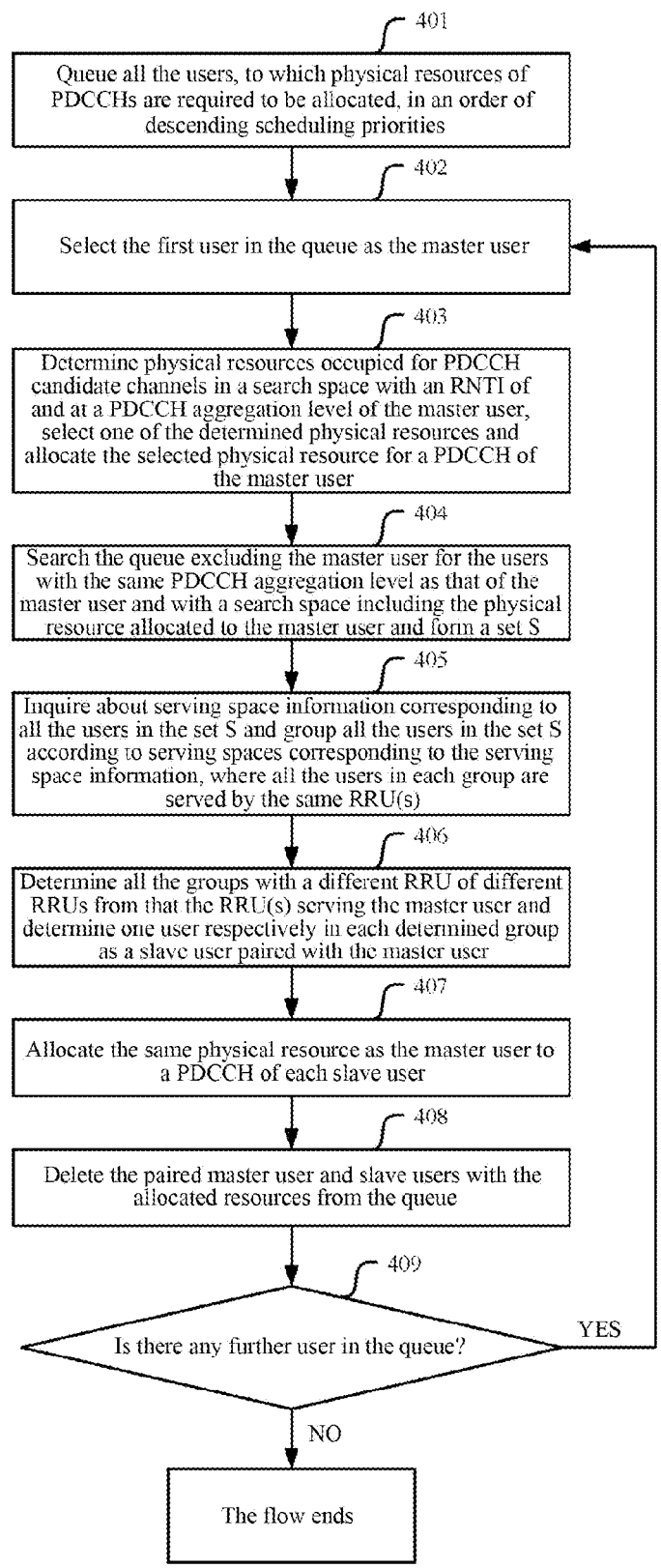
FIG. 4 is a flow chart of details of allocating a resource for an SDMA-enabled PDCCH according to an embodiment of the invention.

As illustrated in FIG. 4, a resource is allocated for an SDMA-enabled PDCCH according to an embodiment of the invention in the following operations 401 to 409:

The operation 401 is to queue all the users, to which physical resources of PDCCHs are required to be allocated, in an order of descending scheduling priorities;

The operation 402 is to select the first user in the queue as the master user;

The operation 403 is to determine physical resources occupied for PDCCH candidate channels in a search space with an RNTI of and at a PDCCH aggregation level of the master user (physical resources unoccupied in the search space with the RNTI of and at the PDCCH aggregation level of the master user), to select one of the determined physical resources and to allocate the selected physical resource to a PDCCH of the master user.

The operation 404 is to search the queue excluding the master user for the users with the same PDCCH aggregation level as that of the master user and with a search space including the physical resource allocated to the master user and to form a set 0.

The operation 405 is to inquire about serving space information corresponding to all the users in the set S and to group all the users in the set S according to serving spaces corresponding to the serving space information, where all the users in each group are served by the same RRU(s).

The operation 406 is to determine all the groups with (a) different RRU(s) from the RRU(s) serving the master user and to determine one user respectively in each determined group as a slave user paired with the master user.

The operation 407 is to allocate the same physical resource as the master user to a PDCCH of each slave user.

The operation 408 is to delete the paired master user and slave users with the allocated resources from the queue.

Particularly the operation 408 can alternatively be performed between the operation 406 and the operation 407 or concurrently with the operation 407; and correspondingly the operation 408 is to delete the paired master user and slave users from the queue.

The operation 409 is to determine whether there is a further user in the queue, and if so, then the process returns to the operation 402; otherwise, this flow ends.

Furthermore a resource of a PDCCH is allocated dependent upon an RNTI of a user, and each RNTI corresponds to a specific search space; and a UE designated search space location is determined by both the RNTI and an aggregation level of the user, and the RNTI of the user is allocated during an initial access of the user and will not be changed in a scheduling procedure. In order to optimize an RNTI allocation scheme to better support space division multiplexing, there is provided in an embodiment of the invention a solution to allocation of an RNTI of a user according to a space or spaces serving the user (i.e., an RRU or RRUs serving the user) so as to ensure possible space division multiplexing of PDCCHs of users in different serving spaces, and this solution can also be applicable to other channels similar to a PDCCH and with a user resource location determined by an RNTI.

Figure 5:
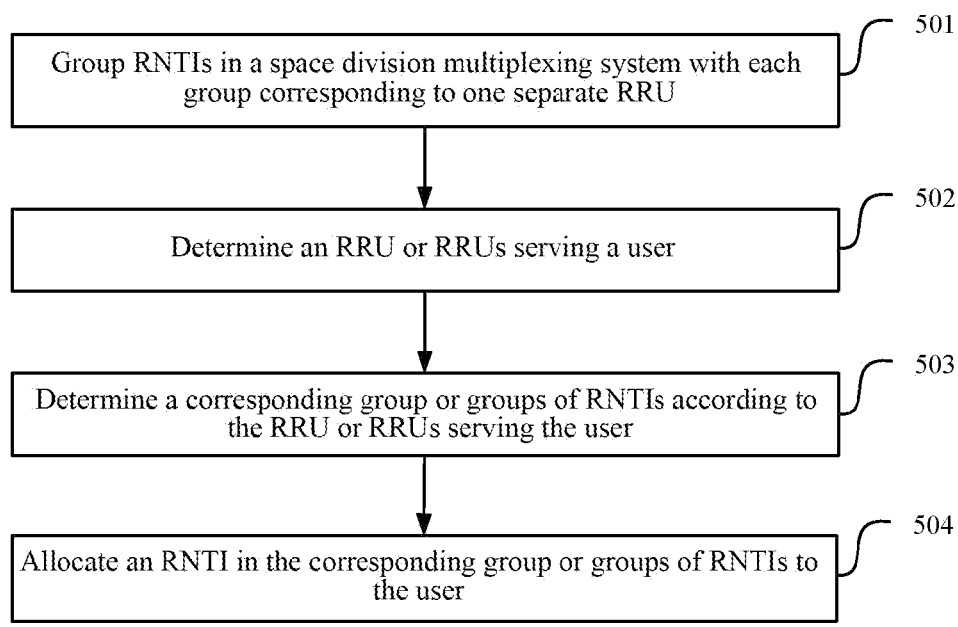
FIG. 5 is a flow chart of allocating an RNTI of a user according to an embodiment of the invention.

As illustrated in FIG. 5 which is a schematic diagram of allocating an RNTI according to an embodiment of the invention, an RNTI can be allocated in the following operations 501 to 504:

The operation 501 is to group RNTIs in a space division multiplexing system with each group corresponding to one separate RRU.

In this operation, RNTIs in a system are grouped with each group corresponding to one separate RRU and particularly can be grouped in a resource allocation equation of one or more channels.

The operation 502 is to determine an RRU or RRUs serving a user;

In this operation, an RRU or RRUs serving a user can be determined by deciding a serving space or serving spaces for the user.

The operation 503 is to determine a corresponding group or groups of RNTIs according to the RRU(s) serving the user; and The operation 504 is to allocate an RNTI in the corresponding group or groups of RNTIs to the user.

In an implementation, an eNB can group RNTIs in a space division multiplexing system by grouping the RNTIs in a resource allocation equation of one or more channels.

Specifically if the RNTIs are grouped in a resource allocation equation of only one channel, then a search space corresponding to each RNTI can be calculated respectively, and the RNTIs with the same search space can be arranged in a column, and users per column can be allocated to the respective groups.

For allocation, the proportions of users in the respective groups can be estimated roughly according to the number of groups and to the coverage areas of separate spaces and the densities of users corresponding to the respective groups, and then the numbers of RNTIs in the respective groups can be determined according to the proportions. An equal allocation scheme can be adopted directly in a scenario with inconvenient estimation.

If resources are allocated and grouped for a plurality of channels, then a search space corresponding to each RNTI can be calculated respectively for each channel, the RNTIs with the same search space for the plurality of channels can be arranged in a column, and then they can be grouped as above.

In an implementation, the eNB can allocate an RNTI in the corresponding group or groups of RNTIs to the user in any one or combination of the following schemes:

1. When the user is served by one RRU, one RNTI is selected randomly from the corresponding group of RNTIs or one RNTI is selected in an order of arrangement in grouping and then allocated to the user;

2. When the user is served by a plurality of RRUs, one RNTI is selected from the groups of RNTIs corresponding to the respective serving RRUs randomly or in an order of arrangement in grouping and then allocated to the user; and 3. When the user is served by a plurality of RRUs, one of the groups of RNTIs corresponding to the respective serving RRUs is selected under a preset rule, and then one RNTI is selected from the selected group of RNTIs randomly or in an order of arrangement in grouping and then allocated to the user.

Specifically an RNTI can be allocated to a user by selecting, for allocation to each user, one RNTI in the group of RNTIs corresponding to the RRU serving the user randomly or in an order of arrangement in grouping or under a criterion; and For a user served by a plurality of spaces, an RNTI can be selected in the groups of RNTIs corresponding to the plurality of spaces serving the user randomly or in an order of arrangement in grouping; or one of the groups can be selected under a criterion in advance, for example, the group with the largest number of remaining RNTIs, and then an RNTI for allocation can be selected from the group randomly or in an order of arrangement in grouping or under a criterion.

In an implementation, there may be further included:

The eNB determines whether the RRU(s) serving the user is changed;

The eNB determines a corresponding group or groups of RNTIs according to the RRU(s) serving the user upon determining occurrence of a change; and The eNB allocates an RNTI in the corresponding group or groups of RNTIs to the user.

In an implementation, the eNB can allocate an RNTI in the corresponding group or groups of RNTIs to the user by allocating the RNTI to the user in a random access procedure of the user after instructing the user to initiate a random access.

Specifically the eNB can update serving information of the user periodically and determine whether the serving information of the user is changed, and if the serving information is changed, then the eNB instructs the user to initiate a new random access, reallocates an RNTI to the user and refills an RNTI originally allocated to the user into the serving group of the user.

This operation of allocating an RNTI can allocate the RNTI randomly to the user or in the schemes described in the foregoing embodiment, and a SDMA on a control channel can be performed regardless of whichever scheme is adopted.

3) For a Physical Uplink Shared Channel (PUSCH):

Whether to SDMA-enable a Physical Uplink Shared Channel (PUSCH) is determined by comparing the total amount of uplink traffic information in a current cell with a first uplink enabling threshold and a first uplink disabling threshold, preferably in the following scheme:

The PUSCH is SDMA-enabled upon determining that the current PUSCH is SDMA-disabled and that the total amount of uplink traffic information in the current cell is above the first uplink enabling threshold for a fifth preset length of time; and The PUSCH is SDMA-disabled upon determining that the current PUSCH is SDMA-enabled and that the total amount of uplink traffic information in the current cell is below or at the first uplink disabling threshold for a sixth preset length of time.

When the PUSCH is SDMA-enabled, a resource is allocated in an SDMA scheme for the PUSCH, that is, users served by different spaces are paired on the PUSCH, and the same physical resource is allocated to data transmission of the paired users on the PUSCH.

In this embodiment, the foregoing first uplink enabling threshold is above the first uplink disabling threshold, and the fifth preset length of time and the sixth preset length of time can be set flexibly as needed and may be the same or may be different.

4) For an Uplink Demodulation Reference Signal (DMRS):

Both the space division multiplexing schemes for the different physical channels and a space division multiplexing scheme for an uplink Demodulation Reference Signal (DMRS) are given in the embodiments of the invention. Different uplink DMRSs are allocated to different users for demodulation of reception signals of the different users; and scheduling of an uplink DMRS is bound with scheduling of a PUSCH, and thus whether to allocate the uplink Demodulation Reference Signal (DMRS) in an SDMA scheme is determined according to an SDMA-enabling state of the PUSCH and by comparing the number of users to be scheduled in a current cell with a second uplink enabling threshold and a second uplink disabling threshold or the total amount of uplink traffic information with a third uplink enabling threshold and a third uplink disabling threshold. Since the DMRS is intended for different users, allocation of the DMRS in an SDMA scheme can be determined from the number of users to be scheduled in the current cell, and furthermore the amount of uplink traffic information can also reflect indirectly the number of users to be scheduled in the current cell, so whether to allocate the DMRS in an SDMA scheme can alternatively be determined from the total amount of uplink traffic information, particularly in the following scheme:

The uplink DMRS is allocated in an SDMA scheme upon determining that the PUSCH is SDMA-enabled and the current uplink DMRS is not allocated in an SDMA scheme and that the number of users to be scheduled in the current cell is above the second uplink enabling threshold for a seventh preset length of time or the total amount of uplink traffic information is above the third uplink enabling threshold for the seventh preset length of time;

The uplink DMRS is not allocated any more in an SDMA scheme upon determining that the current uplink DMRS is allocated in an SDMA scheme and that the number of users to be scheduled in the cell is below or at the second uplink disabling threshold for an eighth preset length of time or the total amount of uplink traffic information is below or at the third uplink disabling threshold for the eighth preset length of time; and The uplink DMRS is SDMA-disabled upon determining that the PUSCH is SDMA-disabled.

The same DMRS is allocated to users paired on the PUSCH when the DMRS is allocated in an SDMA scheme.

In this embodiment, the second enabling threshold is above the second disabling threshold, and the third enabling threshold is above the third disabling threshold, and the seventh preset length of time and the eighth preset length of time can be set flexibly and may be the same or may be different.

5) For an HARQ Indicator Channel (PHICH):

The resource location of a PHICH is determined by a PUSCH corresponding thereto and a DMRS of the PSUCH. In this embodiment, the HARQ Indicator Channel (PHICH) is SDMA-enabled upon determining that the PUSCH is SDMA-enabled and the uplink DMRS is allocated in an SDMA scheme;

Otherwise, the PHICH is SDMA-disabled.

When the PHICH is SDMA-enabled, a resource is allocated in an SDMA scheme for the PHICH, that is, users served by different spaces are paired on the PHICH, and the same physical resource is allocated to data transmission of the paired users on the PHICH. Preferably specific paired users are the same as those on the SDMA-enabled PUSCH.

6) For a PUCCH Which is not Dynamically Scheduled:

Whether to SDMA-enable a PUCCH which is not dynamically scheduled is determined by comparing the total amount of uplink control information required for currently scheduled users with a fourth uplink enabling threshold and a fourth uplink disabling threshold, particularly in the following scheme:

The PUCCH which is not dynamically scheduled is SDMA-enabled upon determining that the PUCCH which is not dynamically scheduled is SDMA-disabled and that the total amount of uplink control information required for the currently scheduled users is above the fourth uplink enabling threshold for a ninth preset length of time; and The PUCCH which is not dynamically scheduled is SDMA-disabled upon determining that the PUCCH which is not dynamically scheduled is SDMA-enabled and that the total amount of uplink control information required for the currently scheduled users is below or at the fourth uplink disabling threshold for a tenth preset length of time.

When the PUCCH which is not dynamically scheduled is SDMA-enabled, a resource is allocated in an SDMA scheme for the PUCCH which is not dynamically scheduled, that is, users served by different spaces are paired on the PDSCH which is not dynamically scheduled, and the same physical resource is allocated to data transmission of the paired users on the PUCCH which is not dynamically scheduled.

In this embodiment, the foregoing fourth uplink enabling threshold is above the fourth uplink disabling threshold, and the ninth preset length of time and the tenth preset length of time can be set flexibly and may be the same or may be different.

Furthermore the first preset length of time to the tenth preset length of time as referred to in the embodiments of the invention are not associated with each other and can be set flexibly for specific application scenarios.

In the foregoing method for communication using a Space Division Multiple Access (SDMA) according to the embodiments of the invention, whether to SDMA-enable the respective channels is determined according to the corresponding amounts of service information and amounts of control information on the different channels and the decision thresholds corresponding to the channels as well as a correspondence relationship of resource locations between the respective channels; and whether to SDMA-enable the respective channels decides resource allocation schemes on the channels in that when a channel is SDMA-disabled, allocation of a resource of the channel is scheduled uniformly for users of respective serving spaces, and all the user data on the channel are transmitted on all RRUs; and when a channel is SDMA-enabled, a resource is allocated for the channel in an SDMA scheme, and data of the respective users on the channel are transmitted on the RRUs serving the respective users. Thus multiplexing of resources across different floors of RRUs can improve the overall throughput and user data transmission ratio of the system and improve the number of users accommodated in and the spectrum utilization ratio of the system; a cell handover can be avoided when a user moves between the RRUs to thereby lower an overhead of signalling required for the system; and whether a channel is SDMA-enabled can be adjusted at any time to thereby avoid unnecessary interference introduction as much as possible and provide the user with an optimum performance experience.

The invention has wide applicability, can be applicable to any Time Division Duplex (TDD) system or Frequency Division Duplex (FDD) system and can address effectively the problem of indoor dense coverage of users in a building and outdoor coverage in a special scenario.

Based upon the same inventive idea, there is further provided in an embodiment of the invention an eNB, and since the eNB addresses the problem under a similar principle to the method for communication using a Space Division Multiple Access (SDMA), reference can be made to the implementations of the method for an implementation of the eNB, a repeated description of which will be omitted here.

Figure 6:
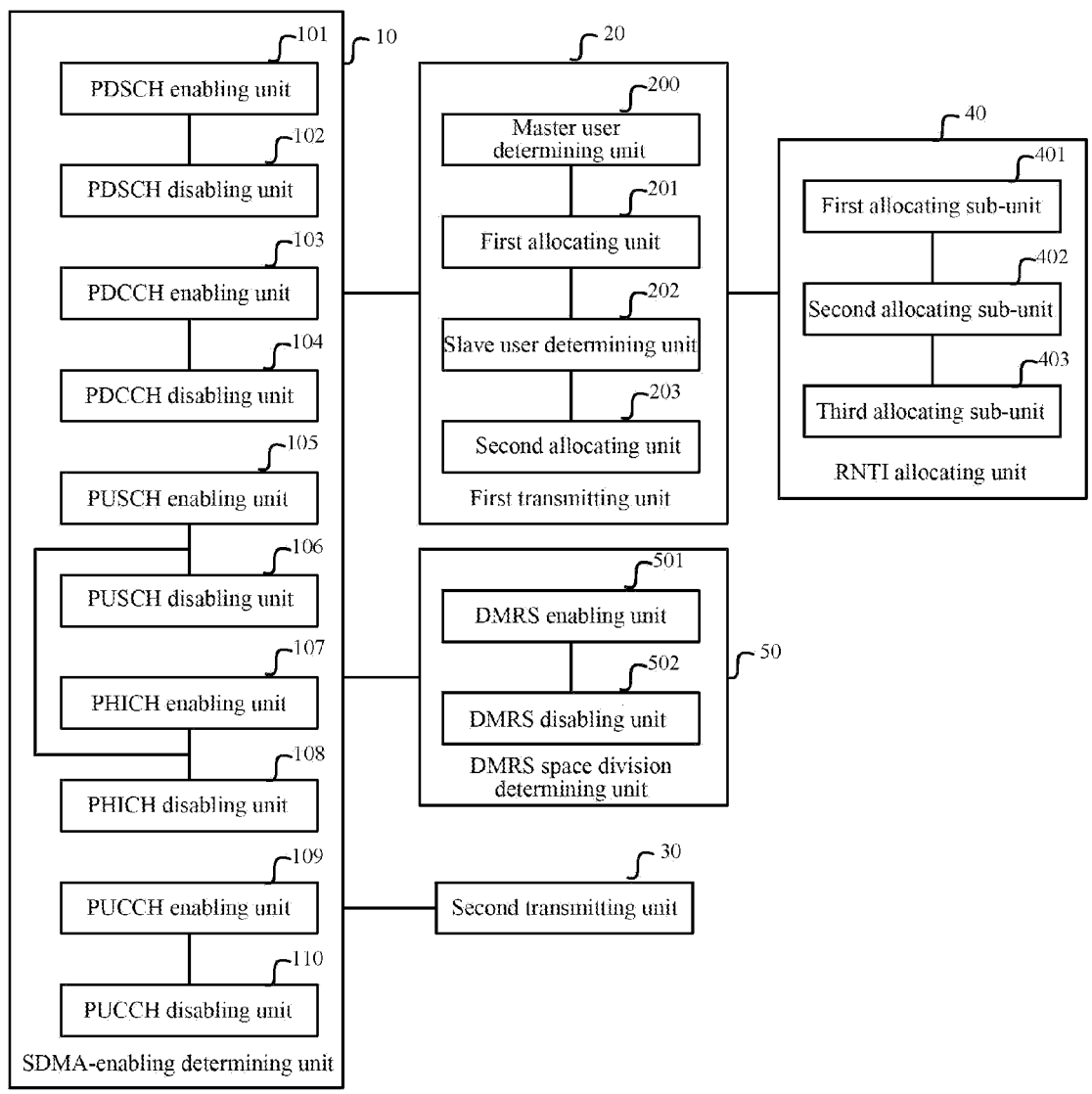
FIG. 6 is a structural block diagram of an eNB according to an embodiment of the invention.

As illustrated in FIG. 6, an eNB according to an embodiment of the invention includes:

an SDMA-enabling determining unit 10 configured, for each of channels including a traffic channel and a control channel, to determine whether to SDMA-enable the channel according to the amount of traffic information and/or the amount of control information of the channel and a decision threshold corresponding to the channel;

a first transmitting unit 20 configured to allocate a resource in an SDMA scheme for the SDMA-enabled channel and transmit data of each user on the channel only on an RRU or RRUs serving the user according to a decision result of a Remote Radio Unit (RRU) serving each user; and a second transmitting unit 30 configured, for the SDMA-disabled channel, to transmit all data on the channel on all RRUs.

In an implementation, the SDMA-enabling determining unit 10 is particularly configured to determine whether to SDMA-enable a Physical Downlink Shared Channel (PDSCH) by comparing the total amount of downlink traffic information in a current cell with a first downlink enabling threshold and a first downlink disabling threshold.

In an implementation, the SDMA-enabling determining unit 10 particularly includes:

a PDSCH enabling unit 101 configured to determine the PDSCH to be SDMA-enabled upon determining that the current PDSCH is SDMA-disabled and that the total amount of downlink traffic information in the current cell is above the first downlink enabling threshold for a first preset length of time; and a PDSCH disabling unit 102 configured to determine the PDSCH to be SDMA-disabled upon determining that the current PDSCH is SDMA-enabled and that the total amount of downlink traffic information in the current cell is below or at the first downlink disabling threshold for a second preset length of time.

In an implementation, the SDMA-enabling determining unit 10 is particularly configured to determine whether to SDMA-enable a Physical Downlink Control Channel (PDCCH) and a corresponding dynamically scheduled Physical Uplink Control Channel (PDCCH) by comparing the amount of downlink control information required for currently scheduled users with a second downlink enabling threshold and a second downlink disabling threshold.

In an implementation, the SDMA-enabling determining unit 10 particularly includes:

a PDCCH enabling unit 103 configured to determine the PDCCH and the corresponding dynamically scheduled PUCCH thereof to be SDMA-enabled upon determining that the PDCCH is SDMA-disabled and that the amount of downlink control information required for the currently scheduled users is above the second downlink enabling threshold for a third preset length of time; and a PDCCH disabling unit 104 configured to determine the PDCCH and the corresponding dynamically scheduled PUCCH thereof to be SDMA-disabled upon determining that the PDCCH is SDMA-enabled and that the amount of downlink control information required for the currently scheduled users is below or at the second downlink disabling threshold for a fourth preset length of time.

In an implementation, the first transmitting unit 20 particularly includes:

a first allocating unit 201 configured to allocate a physical resource for a PDCCH of a scheduled master user according to currently PDCCH-scheduled users when the PDCCH is SDMA-enabled;

a salve user determining unit 202 configured to determine slave users paired with the master user according to a channel aggregation level of the master user and the allocated physical resource; and a second allocating unit 203 configured to allocate the same physical resource as the master user to a PDCCH of each slave user.

In an implementation, the first allocating unit 201 is particularly configured to obtain physical resources unoccupied in a search space determined by a Radio Network Temporary Identifier (RNTI) of and a channel aggregation level of the master user and to select one of the obtained physical resources and to allocate the selected physical resource for the PDCCH of the master user.

In an implementation, the first allocating unit 201 is particularly configured to select one of the obtained physical resources in an order of logic indexes of the physical resources; or to select one of the obtained physical resources randomly; or to determine the number of slave users, paired with the master user, who can be supported on each unoccupied physical resource and to select a physical resource with the corresponding number above a threshold.

In an implementation, the slave users, paired with the master user, determined by the slave user determining unit 202 each have the same channel aggregation level as that of the master user, have a search space including the physical resource allocated to the master user and are served by a different RRU or different RRUs from the RRU or RRUs serving the master user, and each serving RRU includes only one slave user paired with the master user.

In an implementation, the first transmitting unit 20 further includes:

A master user determining unit 200 configured to select one of all the users, to which physical resources of PDCCHs are required to be allocated, as the master user, to delete the master user and the slave users from the users to which physical resources of PDCCHs are required to be allocated after determining the slave users paired with the master user, to determine whether there is a further user for which a physical resource of a PDCCH is required to be allocated, and upon determining that there is a further user for which a physical resource of a PDCCH is required to be allocated, to select one of all the users, to which physical resources of PDCCHs are required to be allocated, as the master user, and to trigger the first allocating unit to allocate the physical resource of the PDCCH to the master user.

In an implementation, the eNB further includes:

an RNTI allocating unit 40 configured to group RNTIs in a space division multiplexing system with each group corresponding to one separate RRU, to determine an RRU or RRUs serving the user, to determine a corresponding group or groups of RNTIs according to the RRU or RRUs serving the user and to allocate an RNTI in the corresponding group or groups of RNTIs to the user.

In an implementation, the RNTI allocating unit 40 is particularly configured to group the RNTIs in the space division multiplexing system by grouping the RNTIs in a resource allocation equation of one or more channels.

In an implementation, the RNTI allocating unit 40 includes any one or combination of the following units:

a first allocating sub-unit 401 configured, when the user is served by one RRU, to select one RNTI randomly from the corresponding group of RNTIs or select one RNTI in an order of arrangement in grouping and to allocate the RNTI to the user;

a second allocating sub-unit 402 configured, when the user is served by a plurality of RRUs, to select one RNTI from the groups of RNTIs corresponding to the respective serving RRUs randomly or in an order of arrangement in grouping and then allocate the RNTI to the user; and a third allocating sub-unit 403 configured, when the user is served by a plurality of RRUs, to select one of the groups of RNTIs corresponding to the respective serving RRUs under a preset rule, and then select one RNTI in the selected group of RNTIs randomly or in an order of arrangement in grouping and then allocate the RNTI to the user.

In an implementation, the SDMA-enabling determining unit 10 is particularly configured to determine whether to SDMA-enable a Physical Uplink Shared Channel (PUSCH) by comparing the total amount of uplink traffic information in a current cell with a first uplink enabling threshold and a first uplink disabling threshold.

In an implementation, the SDMA-enabling determining unit 10 particularly includes:

a PUSCH enabling unit 105 configured to determine the PUSCH to be SDMA-enabled upon determining that the current PUSCH is SDMA-disabled and that the total amount of uplink traffic information in the current cell is above the first uplink enabling threshold for a fifth preset length of time; and a PUSCH disabling unit 106 configured to determine the PUSCH to be SDMA-disabled upon determining that the current PUSCH is SDMA-enabled and that the total amount of uplink traffic information in the current cell is below or at the first uplink disabling threshold for a sixth preset length of time.

In an implementation, the eNB further includes:

a DMRS space division determining unit 50 configured to determine whether to allocate an uplink Demodulation Reference Signal (DMRS) in an SDMA scheme according to an SDMA-enabling state of a PUSCH in a current cell and by comparing the number of users to be scheduled with a second uplink enabling threshold and a second uplink disabling threshold or the total amount of uplink traffic information with a third uplink enabling threshold and a third uplink disabling threshold.

In an implementation, the DMRS space division determining unit 50 particularly includes:

a DMRS enabling unit 501 configured to determine the uplink DMRS to be allocated in an SDMA scheme upon determining that the PUSCH is SDMA-enabled and the current uplink DMRS is not allocated in an SDMA scheme and that the number of users to be scheduled in the current cell is above the second uplink enabling threshold for a seventh preset length of time or the total amount of uplink traffic information is above the third uplink enabling threshold for the seventh preset length of time;

a DMRS disabling unit 502 configured to determine the uplink DMRS not to be allocated any more in an SDMA scheme upon determining that the current uplink DMRS is allocated in an SDMA scheme and that the number of users to be scheduled in the cell is below or at the second uplink disabling threshold for an eighth preset length of time or the total amount of uplink traffic information is below or at the third uplink disabling threshold for the eighth preset length of time; and to determine the uplink DMRS to be SDMA-disabled upon determining that the PUSCH is SDMA-disabled, In an implementation, the SDMA-enabling determining unit 10 particularly includes:

a PHICH enabling unit 107 configured to determine an HARQ Indicator Channel (PHICH) to be SDMA-enabled upon determining that the PUSCH is SDMA-enabled and the uplink DMRS is allocated in an SDMA scheme; and a PHICH disabling unit 108 configured to determine the PHICH to be SDMA-disabled upon determining that the PUSCH is SDMA-disabled or the uplink DMRS is not allocated in an SDMA scheme.

In an implementation, the SDMA-enabling determining unit 10 is particularly configured to determine whether to SDMA-enable a PUCCH which is not dynamically scheduled by comparing the total amount of uplink control information required for currently scheduled users with a fourth uplink enabling threshold and a fourth uplink disabling threshold.

In an implementation, the SDMA-enabling determining unit 10 particularly includes:

a PUCCH enabling unit 109 configured to determine the PUCCH which is not dynamically scheduled to be SDMA-enabled upon determining that the PUCCH which is not dynamically scheduled is SDMA-disabled and that the total amount of uplink control information required for the currently scheduled users is above the fourth uplink enabling threshold for a ninth preset length of time; and a PUCCH disabling unit 110 configured to determine the PUCCH which is not dynamically scheduled to be SDMA-disabled upon determining that the PUCCH which is not dynamically scheduled is SDMA-enabled and that the total amount of uplink control information required for the currently scheduled users is below or at the fourth uplink disabling threshold for a tenth preset length of time.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method for communication using a Space Division Multiple Access, SDMA, comprising:
   for each of channels including a traffic channel and a control channel, determining whether to SDMA-enable the channel according to the amount of traffic information and/or the amount of control information of the channel and a decision threshold corresponding to the channel;
   allocating a resource in an SDMA scheme for a SDMA-enabled channel and transmitting data of each user on the channel only on a Remote Radio Unit, RRU or RRUs, serving the user according to a decision result deciding that the RRU or RRUs serve the user; and
   for a SDMA-disabled channel, transmitting all data on the channel on all RRUs,
   wherein when the channel is a Physical Downlink Shared Channel, PDSCH, the determining whether to SDMA-enable the channel according to the amount of traffic information and/or the amount of control information of the channel and a decision threshold corresponding to the channel comprises:
   determining whether to SDMA-enable the PDSCH by comparing the total amount of downlink traffic information in a current cell with a first downlink enabling threshold and a first downlink disabling threshold.

2. The method of claim 1, wherein the determining whether to SDMA-enable the PDSCH by comparing the total amount of downlink traffic information in a current cell with a first downlink enabling threshold and a first downlink disabling threshold comprises:
   SDMA-enabling the PDSCH upon determining that the current PDSCH is SDMA-disabled and that the total amount of downlink traffic information in the current cell is above the first downlink enabling threshold for a first preset length of time; and
   SDMA-disabling the PDSCH upon determining that the current PDSCH is SDMA-enabled and that the total amount of downlink traffic information in the current cell is below or at the first downlink disabling threshold for a second preset length of time.

3. The method of claim 1, wherein when the channel is a Physical Downlink Control Channel, PDCCH, the determining whether to SDMA-enable the channel according to the amount of traffic information and/or the amount of control information of the channel and a decision threshold corresponding to the channel comprises:
   determining whether to SDMA-enable the PDCCH and a corresponding dynamically scheduled Physical Uplink Control Channel, PUCCH, by comparing the amount of downlink control information required for currently scheduled users with a second downlink enabling threshold and a second downlink disabling threshold.

4. The method of claim 3, wherein the determining whether to SDMA-enable the PDCCH and a corresponding dynamically scheduled PUCCH by comparing the amount of downlink control information required for currently scheduled users with a second downlink enabling threshold and a second downlink disabling threshold comprises:
   SDMA-enabling the PDCCH and the corresponding dynamically scheduled PUCCH upon determining that the PDCCH is SDMA-disabled and that the amount of downlink control information required for the currently scheduled users is above the second downlink enabling threshold for a third preset length of time; and
   SDMA-disabling the PDCCH and the corresponding dynamically scheduled PUCCH upon determining that the PDCCH is SDMA-enabled and that the amount of downlink control information required for the currently scheduled users is below or at the second downlink disabling threshold for a fourth preset length of time.

5. The method of claim 3, wherein when the PDCCH is SDMA-enabled, the allocating a resource in an SDMA scheme for the SDMA-enabled channel comprises:
   allocating a physical resource for a PDCCH of a scheduled master user according to currently PDCCH-scheduled users;
   determining slave users paired with the master user according to a channel aggregation level of the master user and the allocated physical resource; and
   allocating the same physical resource as the master user to a PDCCH of each slave user.

6. The method of claim 5, wherein the allocating a physical resource for a PDCCH of a scheduled master user comprises:
   obtaining physical resources unoccupied in a search space determined by a Radio Network Temporary Identifier, RNTI, of and a channel aggregation level of the master user; and
   selecting one of the obtained physical resources and allocating the selected physical resource for the PDCCH of the master user.

7. The method of claim 6, wherein the selecting one of the physical resources comprises:
   selecting one of the obtained physical resources in an order of logic indexes of the physical resources; or
   selecting one of the obtained physical resources randomly; or
   determining the number of slave users, paired with the master user, who can be supported on each unoccupied physical resource and selecting a physical resource with the number above a threshold.

8. The method of claim 6, wherein the RNTI is allocated by:
   grouping RNTIs in a space division multiplexing system with each group corresponding to one RRU;
   determining an RRU or RRUs serving a user and determining a corresponding group or groups of RNTIs according to the RRU or RRUs serving the user; and
   allocating an RNTI in the corresponding group or groups of RNTIs to the user.

9. The method of claim 8 wherein the RNTIs in the space division multiplexing system are grouped by grouping the RNTIs in a resource allocation equation of one or more channels; and/or
- an RNTI in the corresponding group or groups of RNTIs is allocated to the user in any one or combination of:
- when the user is served by one RRU, selecting one RNTI from the corresponding group of RNTIs randomly or in an order of arrangement in grouping and then allocating the RNTI to the user;
- when the user is served by a plurality of RRUs, selecting one RNTI from groups of RNTIs corresponding to the serving RRUs randomly or in an order of arrangement in grouping and then allocating the RNTI to the user; and
- when the user is served by a plurality of RRUs, selecting one of the groups of RNTIs corresponding to the serving RRUs under a preset rule, and then selecting one RNTI from the selected group of RNTIs randomly or in an order of arrangement in grouping and then allocating the RNTI to the user.

10. The method of claim 5, wherein the determined slave users paired with the master user each have the same channel aggregation level as that of the master user, have a search space including the physical resource allocated to the master user and are served by a different RRU or different RRUs from the RRU or RRUs serving the master user, and each serving RRU includes only one slave user paired with the master user.

11. The method of claim 5, wherein the master user is determined by:
- selecting one of all users, to which physical resources of PDCCHs are required to be allocated, as the master user;
- after the determining slave users paired with the master user, the method further comprises:
- deleting the master user and the slave users from the users to which physical resources of PDCCHs are required to be allocated, and determining whether there are further users for which physical resources of PDCCHs are required to be allocated; and
- upon determining that there are further users for which physical resources of PDCCHs are required to be allocated, selecting one of all the further users, to which physical resources of PDCCHs are required to be allocated, as the master user, and returning to the operation of allocating a physical resource of a PDCCH to the master user.

12. The method of claim 1, wherein when the channel is a Physical Uplink Shared Channel, PDCCH, the determining whether to SDMA-enable the channel according to the amount of traffic information and/or the amount of control information of the channel and a decision threshold corresponding to the channel comprises:
- determining whether to SDMA-enable the PUSCH by comparing the total amount of uplink traffic information in a current cell with a first uplink enabling threshold and a first uplink disabling threshold.

13. The method of claim 12, wherein the determining whether to SDMA-enable the PUSCH by comparing the total amount of uplink traffic information in a current cell with a first uplink enabling threshold and a first uplink disabling threshold comprises:
- SDMA-enabling the PUSCH upon determining that the current PUSCH is SDMA-disabled and that the total amount of uplink traffic information in the current cell is above the first uplink enabling threshold for a fifth preset length of time; and
- SDMA-disabling the PUSCH upon determining that the current PUSCH is SDMA-enabled and that the total amount of uplink traffic information in the current cell is below or at the first uplink disabling threshold for a sixth preset length of time.

14. The method of claim 1, further comprising:
- determining whether to allocate an uplink Demodulation Reference Signal, DMRS, in an SDMA scheme according to an SDMA-enabling state of a PUSCH and by comparing the number of users to be scheduled in a current cell with a second uplink enabling threshold and a second uplink disabling threshold or the total amount of uplink traffic information with a third uplink enabling threshold and a third uplink disabling threshold.

15. The method of claim 14, wherein the determining whether to allocate an uplink DMRS in an SDMA scheme according to an SDMA-enabling state of a PUSCH and by comparing the number of users to be scheduled in a current cell with a second uplink enabling threshold and a second uplink disabling threshold or the total amount of uplink traffic information with a third uplink enabling threshold and a third uplink disabling threshold comprises:
- allocating the uplink DMRS in the SDMA scheme upon determining that the PUSCH is SDMA-enabled and the current uplink DMRS is not allocated in the SDMA scheme and that the number of users to be scheduled in the current cell is above the second uplink enabling threshold for a seventh preset length of time or the total amount of uplink traffic information is above the third uplink enabling threshold for the seventh preset length of time;
- terminating allocation of the uplink DMRS in the SDMA scheme upon determining that the current uplink DMRS is allocated in the SDMA scheme and that the number of users to be scheduled in the cell is below or at the second uplink disabling threshold for an eighth preset length of time or the total amount of uplink traffic information is below or at the third uplink disabling threshold for the eighth preset length of time; and
- SDMA-disabling the uplink DMRS upon determining that the PUCCH is SDMA-disabled.

16. The method of claim 1, wherein when the channel is an HARQ Indicator Channel, PHICH, the determining whether to SDMA-enable the channel according to the amount of traffic information and/or the amount of control information of the channel and a decision threshold corresponding to the channel comprises:
- SDMA-enabling the HARQ Indicator Channel, PHICH, upon determining that the PUSCH is SDMA-enabled and the uplink DMRS is allocated in an SDMA scheme; and
- otherwise, SDMA-disabling the PHICH.

17. The method of claim 1, wherein when the channel is a PUCCH which is not dynamically scheduled, the determining whether to SDMA-enable the channel according to the amount of traffic information and/or the amount of control information of the channel and a decision threshold corresponding to the channel comprises:
- determining whether to SDMA-enable the PUCCH which is not dynamically scheduled by comparing the total amount of uplink control information required for currently scheduled users with a fourth uplink enabling threshold and a fourth uplink disabling threshold.

18. The method of claim 17, wherein the determining whether to SDMA-enable the PUCCH which is not dynamically scheduled by comparing the total amount of uplink control information required for currently scheduled users with a fourth uplink enabling threshold and a fourth uplink disabling threshold comprises:

SDMA-enabling the PUCCH which is not dynamically scheduled upon determining that the PUCCH which is not dynamically scheduled is SDMA-disabled and that the total amount of uplink control information required for the currently scheduled users is above the fourth uplink enabling threshold for a ninth preset length of time; and SDMA-disabling the PUCCH which is not dynamically scheduled upon determining that the PUCCH which is not dynamically scheduled is SDMA-enabled and that the total amount of uplink control information required for the currently scheduled users is below or at the fourth uplink disabling threshold for a tenth preset length of time.

19. An eNB, comprising:

an SDMA-enabling determining unit configured, for each of channels including a traffic channel and a control channel, to determine whether to SDMA-enable the channel according to the amount of traffic information and/or the amount of control information of the channel and a decision threshold corresponding to the channel;

a first transmitting unit configured to allocate a resource in an SDMA scheme for a SDMA-enabled channel and to transmit data of each user on the channel only on a Remote Radio Unit, RRU, or RRUs serving the user according to a decision result deciding that the RRU or RRUs serve the user; and a second transmitting unit configured, for a SDMA-disabled channel, to transmit all data on the channel on all RRUs, wherein when the channel is a Physical Downlink Shared Channel, PDSCH, the determining whether to SDMA-enable the channel according to the amount of traffic information and/or the amount of control information of the channel and a decision threshold corresponding to the channel comprises:

determining whether to SDMA-enable the PDSCH by comparing the total amount of downlink traffic information in a current cell with a first downlink enabling threshold and a first downlink disabling threshold.

* * * * *